United States Patent [19]
Westre

[11] Patent Number: 5,171,099
[45] Date of Patent: Dec. 15, 1992

[54] APPARATUS TO ATTACH A SANDWICH PANEL

[75] Inventor: Willard N. Westre, Bellevue, Wash.

[73] Assignee: The Boeing Company, Seattle, Wash.

[21] Appl. No.: 608,005

[22] Filed: Nov. 1, 1990

[51] Int. Cl.$^5$ .......................... F16B 9/00; B64C 11/26
[52] U.S. Cl. ................... 403/264; 403/407.1;
411/104; 416/230; 416/229 R
[58] Field of Search .................. 403/407.1, 405.1, 201,
403/252, 258, 264, 231, 255, 254; 411/104, 84,
85; 244/131; 416/142, 204 R, 229 R, 230 R;
52/799, 806

[56] References Cited

U.S. PATENT DOCUMENTS

| | | |
|---|---|---|
| 1,542,481 | 6/1925 | Spiro . |
| 3,285,311 | 11/1966 | Cushman . |
| 3,512,328 | 5/1970 | Eriksson . |
| 3,835,610 | 9/1974 | Harper et al. .................... 403/231 X |
| 4,021,129 | 5/1977 | Sykes .................... 403/252 |
| 4,412,784 | 11/1983 | Wackerle et al. .......... 416/229 R X |
| 4,671,016 | 6/1987 | Boeckx . |
| 4,717,612 | 1/1988 | Shackelford ....................... 52/806 X |
| 4,732,542 | 3/1988 | Hahn et al. ...................... 416/230 X |
| 4,783,189 | 11/1988 | Bugg .................... 403/264 |
| 4,861,182 | 8/1989 | Gillet .................... 403/264 |
| 4,861,207 | 8/1989 | Do ....................................... 411/104 |
| 4,961,687 | 10/1990 | Bost et al. ............................ 416/230 |
| 5,037,258 | 6/1991 | Heurteux ............................ 411/104 |

FOREIGN PATENT DOCUMENTS

| | | | |
|---|---|---|---|
| 2026623 | 2/1980 | United Kingdom | ................ 416/230 |
| 2039659 | 8/1980 | United Kingdom | ................ 403/231 |

OTHER PUBLICATIONS

"Barrel Nuts," SL50B Series, Shur-Lock Corporation Bulletin, Jun. 1985, 2 pages.
"Bonded Honeycomb Sandwich Construction," TSB 124, Hexcel Corporation Bulletin, pp. 21–25.
*Handbook of Sandwich Design*, Rohr Industries Bulletin, 1 page.

Primary Examiner—Peter M. Cuomo
Attorney, Agent, or Firm—Christensen, O'Connor, Johnson & Kindness

[57] ABSTRACT

An apparatus for attaching a sandwich panel to another structure. A hollow pin passes through the panel near the edge to be joined to the structure. A bolt, passing through the edge of the panel, and barrel nut, inside the hollow of the pin, are used to draw the edge of the panel against a flange attached to the structure. The panel may be reinforced with doublers or an end cap.

18 Claims, 2 Drawing Sheets

APPARATUS TO ATTACH A SANDWICH PANEL

FIELD OF THE INVENTION

The present invention relates to an apparatus which joins a sandwich panel to another structure.

BACKGROUND OF THE INVENTION

Sandwich panels are frequently used in aviation, rocketry, and other applications where high strength and low weight are substantial considerations. As used herein, a sandwich panel includes any panel having an exterior skin attached on both sides of a core material. The skin is usually more rigid and dense than the core and is generally, but not always, made of metal or composite. However, different compositions or types of skin may be used on each side of the panel. The core is generally less stiff or less dense than the skin and may consist of, for example, a honeycombed metal structure, a plastic filler, or foam.

Due to their high strength-to-weight ratio and their durability, sandwich panels often form a portion of the exterior surface of large rockets. For example, in liquid fueled rockets, a sandwich panel is frequently formed into the shape of a cylinder and used to create a "dry bay" between one tank structure containing the oxidizer and another tank structure containing the fuel. Specifically, assuming the oxidizer tank is on top of the fuel tank, the sandwich panel cylinder is placed on top of the fuel tank structure with the bottom edge of the sandwich panel cylinder attached to the top of the fuel tank structure. The oxidizer tank structure is then placed on top of the sandwich panel cylinder with the top edge of the cylinder attached to the bottom of oxidizer tank.

In the example given for the liquid-fueled rocket, the sandwich panel is joined at its top edge to the oxidizer tank structure and at its bottom edge to the fuel tank structure. As the rocket accelerates during launch, both of these joints will obviously be subject to a substantial compressive load which tends to push the panel and each of the respective tank structures together. In addition, as the rocket rolls over from a vertical orientation at lift-off to a more horizontal orientation during flight, the different bending forces acting on the rocket may subject all or a portion of each joint to a moderate tensile load which tends to pull the joint apart.

The methods commonly used to join a sandwich panel to another structure, such as the fuel tank or oxidizer tank in the rocket example, generally feature either shear joints or pan-down joints. In a shear joint, a flange or other member attached to the structure overlaps either the inner or outer skin of the sandwich panel. Bolts or other fasteners pass through both the flange and the panel in a direction normal to the surface of the skin and draw the panel and flange together. The bolts or fasteners must be longer than the combined width of the panel and the flange. In the previously described example of a liquid-fueled rocket, these bolts or fasteners transmit the compressive load from the panel to the flange and a large number of bolts or fasteners are required at each joint.

A pan-down joint is similar to a shear joint, except the panel is fabricated so it is thinner near the edge of the panel to be joined with the structure. For example, the core of the panel near that edge can be machined thinner and the skin of the panel formed to conform with the shape of the machined core. The panel is then attached to the flange using bolts or other fasteners in the same manner described above for shear joints, but with the bolt or fastener passing through the thinner portion panel. As a result, the bolts or fasteners do not need to be as long as those required by shear joints. However, pan-down joints are generally more expensive to make since the core must be machined thinner near the edges and the skin must be formed to conform with the core. In addition, since the core is thinner near the edges, the panel strength or efficiency is reduced near the edge of the panel. Finally, since the compressive load is still transmitted through the bolts or fasteners, a large number of bolts or fasteners are still required.

In both shear joints and pan-down joints, the principal load path for both a compressive load and a tensile load is not a straight line. Instead, the principal load path "jogs" as it passes from the panel to the flange. In addition, due to the large number of relatively long bolts or fasteners required, both joints add substantial weight to the overall apparatus. Moreover, the ability of the joint to bear a compressive load is dependent upon the integrity of the bolts or fasteners since a compressive load is not transferred in bearing, i.e., across a surface which is normal to the direction of the load force, but is instead transferred through the bolts or fasteners. In addition, in both shear joints and pan-down joints, eccentricities in the shape of either the panel or the flange can substantially reduce the efficiency of the joint. Finally, both shear joints and pan-down joints to reduce the overall strength or efficiency of the panel, particularly in the pan-down joints where the core is thinner near the edges.

BRIEF SUMMARY OF THE INVENTION

The present invention is an apparatus for joining a sandwich panel to a structure, wherein the apparatus comprises a flange attached to the structure and formed to abut against an edge of the panel. A fastener is attached to a pin which passes through the panel near the edge of the panel and draws the edge of the panel against the flange. As a result, a compressive load is transferred between the edge of the panel and the flange in bearing, the load path for a compressive load is essentially straight, a limited number of fasteners are required, the joint is relatively light in weight, and none of the fasteners bear any portion of a compressive load. In addition, the joint requires a small number of inexpensive, standard conventional components and is relatively easy to manufacture.

DETAILED DESCRIPTION OF THE PREFERRED EMBODIMENT

Figure 1:
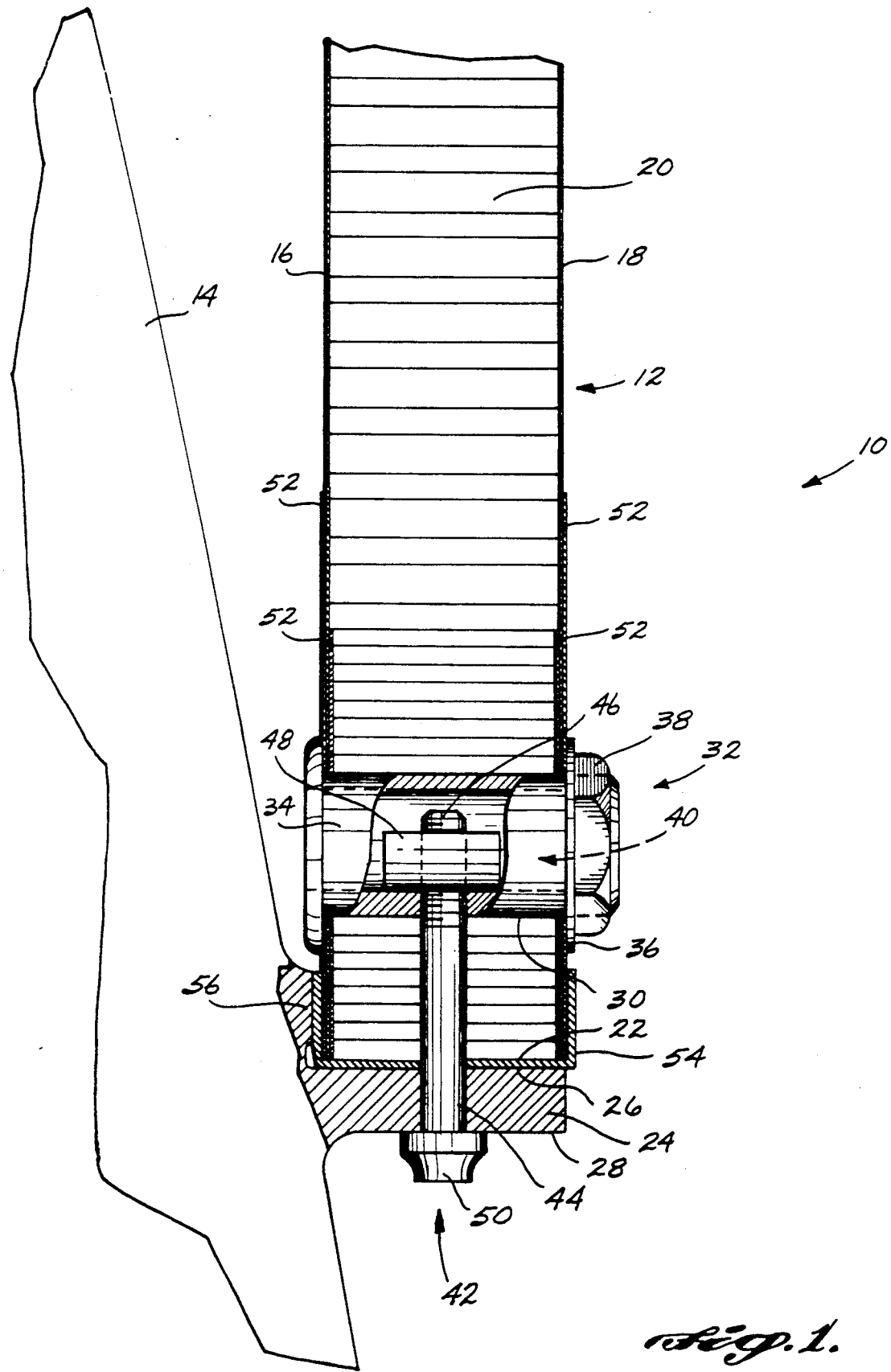
FIG. 1 is a cross-sectional view of a preferred embodiment of the present invention.

Referring initially to FIG. 1, a preferred embodiment of the apparatus 10 for joining a sandwich panel 12 to a structure 14 is disclosed. The sandwich panel 12 in the illustration consists of an inner skin 16 and outer skin 18 attached to a core 20. Although the exterior skins 16, 18 on opposite sides of the panel are identified herein as the inner skin 16 and the outer skin 18, this identification is solely for ease of description and does not imply any necessary structural or functional differences. The contact edge 22 of the panel 12 is the edge of the panel 12 between the inner skin 16 and the outer skin 18 along which the panel 12 is to be joined to the structure 14. In the preferred embodiment, the contact edge 22 is straight and normal to both the inner skin 16 and outer skin 18. However, there is no inherent limitation on the shape or orientation of the contact edge 22 of the panel 12 for purposes of this invention. For example, the contact edge 22 need not be normal to the inner skin 16 or the outer skin 18. Likewise the contact edge 22 need not be straight and can be curved or "A-shaped", for example. Yet, since one of the objects of this invention is for a compressive force to be transmitted in bearing, it is preferable that the contact edge 22 be formed so that a compressive force does not result in any substantial force on the contact edge 22 normal to the compressive load.

A flange 24 is attached to the structure 14 near the location at which the panel 12 is to be joined to the structure 14. The flange 24 has a first surface 26 which is configured so that the contact edge 22 may abut against the first surface 26. In the preferred embodiment illustrated, the first surface 26 is flat, extends the width of the contact edge 22, and is oriented so that the entire contact edge 22 will abut against the first surface 26 of the flange 24 to provide the largest possible surface area for transmitting a compressive load in bearing between the contact edge 22 and the first surface 26 of the flange 24.

The flange 24 also has a second surface 28 opposite the first surface 26. In the preferred embodiment, this second surface 28 is flat and substantially parallel to the first surface 26.

Prior to being brought into position abutting flange 24, a hole 30 is created through the width of the panel 12 near the contact edge 22 of the panel 12 and a pin 32 or other member is inserted through the hole 30. In the preferred embodiment of the invention, the pin 32 is a threaded bolt 34 which fits snugly in the hole 30 and is fastened tightly to the panel 12 using a washer 36 and nut 38. The bolt 34 has an interior cylindrical hollow 40 which extends the entire length of the bolt 34. The interior cylindrical hollow 40 is offset away from the contact edge 22 of the panel 12 to increase the tensile load the apparatus can withstand.

Consistent with one of the objects of this invention, the hollow bolt 34 can be readily fabricated and the nut 38 and washer 36 of the type described are readily and inespensively available as, for example, National Aerospace Standard Part No. NAS1423C16 and Air Force-Navy Aerospace Standard Part No. AN960D1616. However, the invention encompasses virtually any form of pin 32 which passes through the panel 12 including, for example, a rivet affixed to the panel 12; a solid or hollow pin not affixed to the panel 12; a solid or hollow pin affixed to the panel 12 using a nut, split-ring retainer or a weld; or a solid bolt affixed to the panel 12 using a nut, retainer or a weld.

A fastening or holding means 42 between the flange 24 and the pin 32 is used for holding the contact edge 22 of the panel 12 against the first surface 26 of the flange 24. In the preferred embodiment of the invention, the fastening means 42 is a bolt 44 which passes through the second surface 28 and first surface 26 of the flange 24, the contact edge 22 of the panel 12, and into the hollow 40 of the pin 32. The end 46 of the bolt 44 inside the pin 32 is threaded. A barrel nut 48, sized to fit within the hollow 40 of the pin 32 and partially conforming to the shape of the hollow 40 of the pin 32, is attached to the threaded end of the bolt 44. The head 50 of the bolt 44 rests against the second surface 28 of the flange 24.

Consistent with one of the objects of this invention, a bolt 44 and barrel nut 48 of the type described are readily and inexpensively available. The bolt 44 can be a standard machine bolt such as Military Standard Part No. MS21134-04-028 and the barrel nut 48 is available, for example, as Part No. SL4113-4 from Shur-Lock Corp. of Santa Ana, Calif.

Although the bolt and barrel nut combination are the preferred fastening means, the present invention encompasses virtually any means 42 used to fasten the pin 32 to the flange 24. This includes, for example, a fastener which does not pass through the flange 24 or the panel 12, but instead is attached to the flange 24 and the pin 32 external to the skin 16 or 18 of the panel 12. It also includes any form of fastener, such as, for example, a rivet, used in place of the bolt 44/barrel nut 48 combination.

In the above described preferred embodiment, as the bolt 44/barrel nut 48 combination is tightened, the contact edge 22 of the panel 12 is drawn against the first surface 26 of the flange 24. This results in a tight joint between these two surfaces. A compressive load is transmitted in bearing between the contact edge 22 of the panel 12 and the first surface 26 of the flange 24. A tensile load is transmitted between the pin 32 and the second surface 28 of the flange 24 through the bolt 44/barrel nut 48 combination.

In the preferred embodiment, doublers 52 of the same or different material than the skin 16, 18 are attached with adhesive to the interior skin 16 and exterior skin 18 of the panel 12 near the location where the pin 32 passes through the panel 12. However, the present invention includes any doubler 52 which tends to reinforce the panel 12 near the pin 32 to allow a larger tensile load to be transmitted between the pin 32 and the panel 12 without deforming the panel 12 and to allow a larger compressive load between the panel 12 and the flange 24 without buckling the skin 16. In addition, the contact edge 22 of the panel 12 is covered with a sheet metal end cap 54 which overlaps the interior skin 16 and exterior skin 18 of the panel 12 and is attached to both skins 16, 18 using adhesive. Again, however, the present invention includes any end cap 54 which tends to reinforce the contact edge 22 of the panel 12 so that the joint can bear a larger compressive load without deforming or delaminating the panel 12. Finally, in order to mechanically stabilize the joint and aid in the original construction of the joint, a support edge 56 is formed in the flange 24 which further supports the panel 12 at a location distinct from the contact edge 22.

Figure 2:
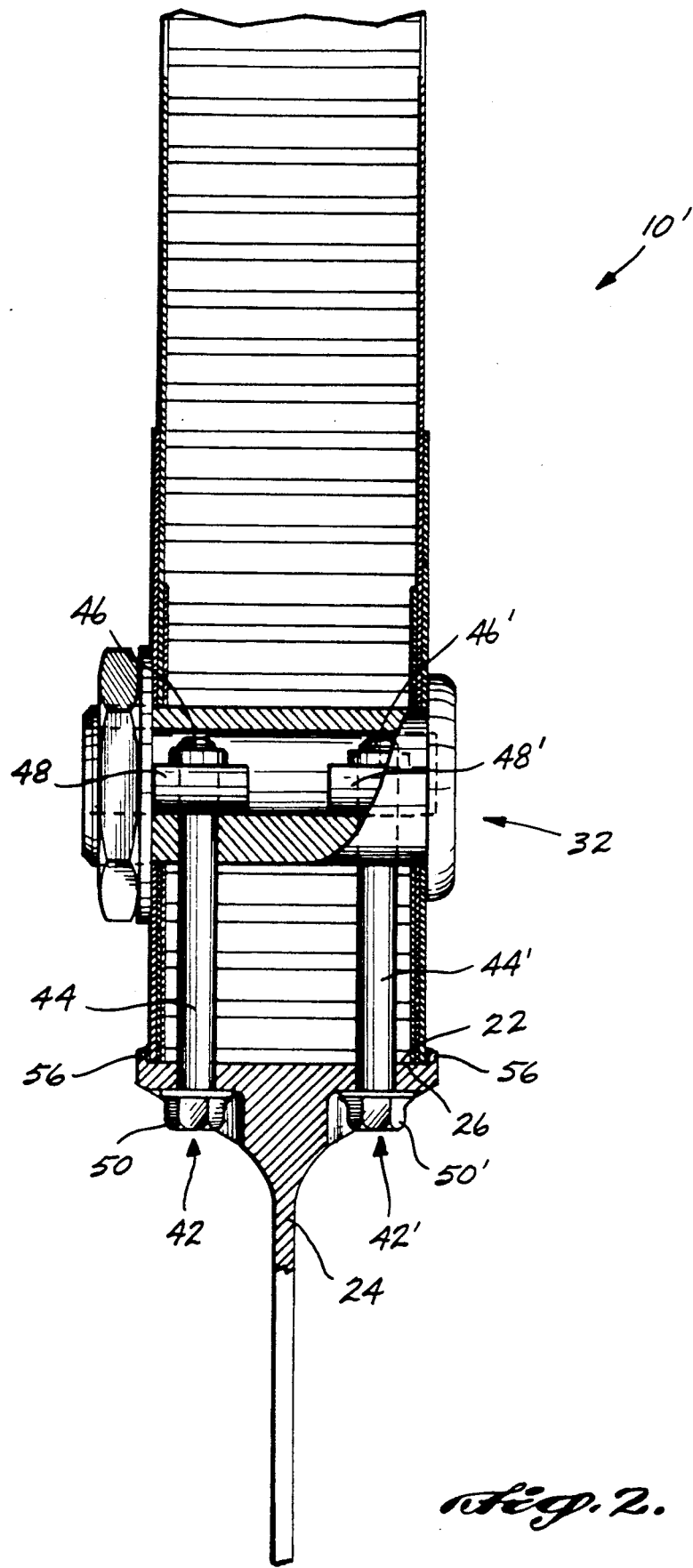
FIG. 2 is a cross-sectional view of an alternative preferred embodiment of the present invention.

In an alternative preferred embodiment of the apparatus 10' shown in FIG. 2, a second fastening or holding means 42' between the flange 24 and the pin 32 is provided for holding the contact edge 22 of the panel 12 against the first surface 26 of the flange 24. Again, this second fastening means 42' preferably consists of a second bolt 44' and barrel nut 48' utilized in the same manner as the bolt 44 and barrel nut 48 in the previously described preferred embodiment of the invention.

Although the alternative preferred embodiment uses more parts, is somewhat more difficult to construct, and weighs slightly more, it has some advantages for particular applications. The alternative preferred embodiment of the invention results in a joint which is mechanically more stable. In addition, for a given size of fastener 42, 42' the alternative preferred embodiment can withstand a greater tensile load. Further, due to the duplicate fasteners 42, 42' the joint of the alternative preferred embodiment may be less susceptible to mechanical failure of a fastener 42, 42'. Moreover, the alternative preferred embodiment provides for a more flexible joint between the panel and flange. Finally, in some circumstances, a tensile load may be more uniformly distributed over the width of the panel 12 and the flange 24 in the alternative preferred embodiment.

The embodiments of the invention in which exclusive property or privilege is claimed are defined as follows:

1. An apparatus for exerting, on a sandwich panel having a relatively rigid external skin on each side of a core that is less rigid than the skin, a tensile force in a direction substantially normal to an edge of the panel, comprising:
   a hollow pin which passes entirely through the panel, including through the skin on each side of the core, near the edge of the panel, has an inside surface extending along at least a portion of the length thereof, and is attached to the skin of the panel; and
   a fastener which passes through the edge of the panel and bears against the inside surface of the pin.

2. The apparatus of claim 1, wherein the fastener comprises a threaded bolt and a first nut which abuts the inside surface of the pin closest to the edge of the panel and is threadably engaged with the bolt.

3. The apparatus of claim 2, further comprising at least one doubler attached to the skin of the panel where the pin passes through the panel.

4. The apparatus of claim 3, wherein:
   the pin has an enlarged head, said inside surface comprising a cylindrical hole passing through the length of the pin offset from the center of the pin and away from the edge of the panel, and a threaded end; and further comprising
   second nut which is threadably engaged with the threaded end of the pin to fasten the pin to the panel.

5. An apparatus for attaching a sandwich panel to a structure, the panel having a relatively rigid external skin on each side of a core that is less rigid than the skin, and a contact edge, the apparatus comprising;
   a flange attached to the structure and having a first surface configured so that the contact edge of the panel may abut the first surface of the flange, the flange also having a second surface opposite the first surface;
   a member passing entirely through the panel, including through the skin on each side of the core, near the contact edge of the panel, the member comprising a pin which is hollow with an inside surface, the pin being rigidly affixed to the panel; and
   a holding means attached to the member and to the flange for holding the contact edge of the panel against the first surface of the flange, the holding means comprising a threaded bolt having a head which abuts the second surface of the flange and a first nut which is threadably engaged with the bolt and abuts the inside surface of the pin.

6. The apparatus of claim 5, wherein:
   the pin has an enlarged head, the inside surface comprises a cylindrical hole passing through the length of the pin, and the pin has a threaded end opposite the enlarged head; and further comprising
   a second nut which is threadably engaged with the threaded end of the pin to fasten the pin to the panel.

7. The apparatus of claim 6, wherein:
   the first nut conforms to a portion of the inside surface of the pin; and
   the cylindrical hole in the pin is offset from the center of the pin and away from the contact edge of the panel.

8. An apparatus for attaching a sandwich panel to a structure, the panel having a relatively rigid external skin on each side of a core that is less rigid than the skin, and a contact edge, comprising:
   a flange attached to the structure and having a first surface configured so that the contact edge of the panel may abut the first surface of the flange;
   a hollow member having an inside surface extending along at least a portion of the length thereof and passing entirely through the panel, including through the skin on each side of the core, near the contact edge of the panel;
   a first holding means attached to the hollow member by abutting said inside surface and to the flange for holding the contact edge of the panel against the first surface of the flange; and
   a second holding means attached to the hollow member by abutting said inside surface and to the flange for holding the contact edge of the panel against the first surface of the flange.

9. The apparatus of claim 8, wherein:
   the flange has at least one second surface opposite the first surface of the flange;
   the hollow member comprises a hollow pin;
   the first holding means comprises a first fastener which passes through the contact edge of the panel and which bears against the second surface of the flange and is attached to the pin; and
   the second holding means comprises a second fastener which passes through the contact edge of the panel and which bears against a second surface of the flange and is attached to the pin.

10. The apparatus of claim 9, wherein:
    the hollow pin is rigidly affixed to the panel;
    the first fastener comprises a first threaded bolt having a head which abuts a second surface of the flange and a first nut which is threadably engaged with the first threaded bolt and abuts the inside surface of the pin; and
    the second fastener comprises a second threaded bolt having a head which abuts a second surface of the flange and a second nut which is threadably engaged with the second threaded bolt and abuts the inside surface of the pin.

11. The apparatus of claim 10, wherein:
    the pin has an enlarged head, said inside surface comprising a cylindrical hole passing through the length of the pin, and a threaded end opposite the enlarged head; and further comprising
    a third nut which is threadably engaged with the threaded end of the pin to fasten the pin to the panel.

12. The apparatus of claim 11, wherein:
    the first nut conforms to a portion of the inside surface of the pin;
    the second nut conforms to a portion of the inside surface of the pin; and
    the cylindrical hole in the pin is offset from the center of the pin and away from the contact edge of the panel.

13. The apparatus of claim 9, further comprising an end cap which covers the contact edge of the panel and contacts the skin on both sides of the panel.

14. The apparatus of claim 9, further comprising at least one doubler attached to at least one of the skins of the panel where the pin passes through the panel.

15. The apparatus of claim 9, wherein the flange has a support edge which supports the panel at a location distinct from the contact edge.

16. An apparatus comprising:
- a sandwich panel, having a relatively rigid external skin on each side of a less rigid core, and a contact edge;
- a flange having a first surface configured so that the contact edge of the panel may abut the first surface of the flange, the flange also having a second surface opposite the first surface;
- a member passing entirely through the panel, including through the skin on each side of the core, near the contact edge of the panel, the member comprising a pin which is hollow with an inside surface, the pin being rigidly affixed to the panel; and
- a holding means attached to the member and to the flange for holding the contact edge of the panel against the first surface of the flange, the holding means comprising a threaded bolt having a head which abuts the second surface of the flange and a first nut which is threadably engaged with the bolt and abuts the inside surface of the pin.

17. The apparatus of claim 16, wherein:
the pin has an enlarged head, the inside surface comprises a cylindrical hole passing through the length of the pin, and the pin has a threaded end opposite the enlarged head; and further comprising
a second nut which is threadably engaged with the threaded end of the pin to fasten the pin to the panel.

18. The apparatus of claim 17, wherein:
the first nut conforms to a portion of the inside surface of the pin; and
the cylindrical hole in the pin is offset from the center of the pin and away from the contact edge of the panel.

* * * * *